No. 822,817. PATENTED JUNE 5, 1906.
M. W. BELL.
RAILWAY JOINT.
APPLICATION FILED OCT. 13, 1905.
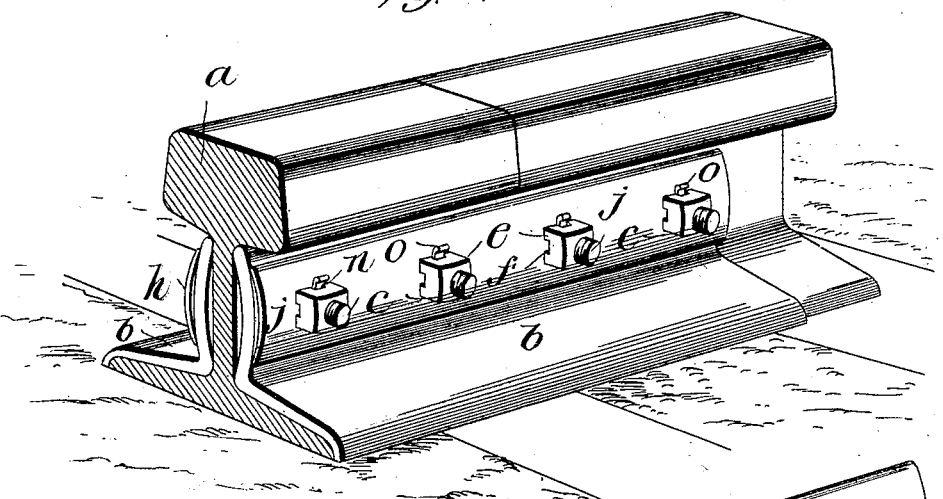
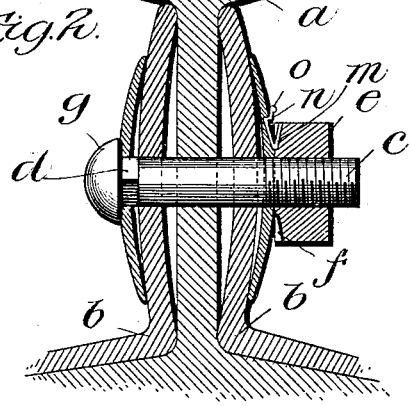
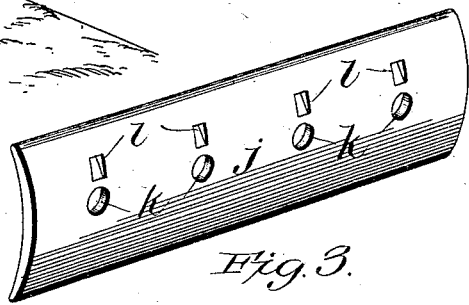
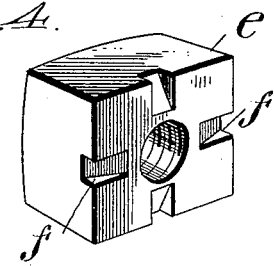
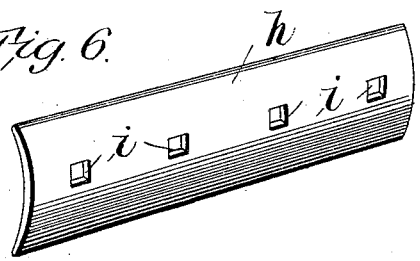
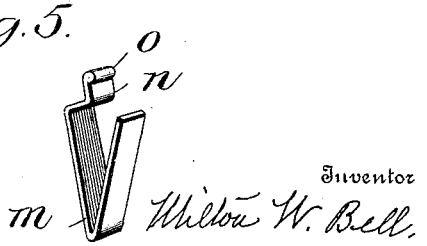
Witnesses
Geo. H. Bruce.
W. Max. Durall.
Inventor
Milton W. Bell.
By Wilkinson & Fisher.
Attorneys

UNITED STATES PATENT OFFICE.

MILTON W. BELL, OF NEW ORLEANS, LOUISIANA.

RAILWAY-JOINT.

No. 822,817.  Specification of Letters Patent.  Patented June 5, 1906.

Application filed October 13, 1905. Serial No. 282,633.

*To all whom it may concern:*

Be it known that I, MILTON W. BELL, a citizen of the United States, residing at New Orleans, in the parish of Orleans and State of Louisiana, have invented certain new and useful Improvements in Railway-Joints; and I do hereby declare the following to be a full, clear, and exact description of the invention, such as will enable others skilled in the art to which it appertains to make and use the same.

My invention relates to improvements in railway-joints; and the object of my invention is to produce a simple and inexpensive railway-joint wherein the ends of the rails will be kept locked in place and which may be applied to any of the existing joints now in use.

With these objects in view my invention consists in the construction and combinations of parts, as hereinafter described and claimed.

In the accompanying drawings, Figure 1 is a perspective view of a railway-joint, showing my invention applied thereto. Fig. 2 is a vertical cross-section thereof. Fig. 3 is a perspective view of one of the spring-plates which are applied outside of the fish-plates. Fig. 4 is a perspective view of the nut. Fig. 5 is a perspective view of the spring-clip for locking the nut, and Fig. 6 is a perspective view of the spring-plate used opposite to the one shown in Fig. 3.

$a$ represents a railroad-rail, and $b$ $b$ the fish-plates. The rail and fish-plates are perforated for the passage of the locking-bolts $c$, preferably made square near one end, as shown at $d$. $e$ represents the nuts for said bolts, which are provided with beveled cut-away portions $f$.

I have shown in the drawings a four-sided nut with a beveled cut-away portion in the center of each of its sides; but it is obvious that any desired shape of nut may be used.

Between the head $g$ of the bolt and the corresponding fish-plate is located a spring-plate $h$, provided with square holes $i$, in which the squared portions $d$ of the bolts fit. Between the nuts $e$ and the other fish-plate is located another spring-plate $j$, provided with round holes $k$, through which the bolts pass, and inclined depressions $l$.

The plates $h$ and $j$ are shown in the drawings as long enough to make a complete railroad-joint; but it is obvious that instead of one long plate several short plates, one for each bolt, could be used.

In the drawings I have shown the nuts as applied to the outside of the rail; but of course the arrangement shown could be reversed, if desired.

The depressions $l$ are arranged at such a distance from the perforations $k$ that each of them will exactly register with one of the cut-away portions $f$ in one of the nuts $e$ when said nut is turned to the proper position, as shown, for example, in Fig. 2, and when the nut is turned so that these recesses are opposite each other the spring-clip $m$ is inserted, firmly locking the parts together, as shown in Fig. 2. This clip $m$ is composed of spring-steel, having two arms inclined to each other and one of said arms being provided with a right-angled portion $n$, having a head $o$, the shape being such that the clip may be easily compressed and slipped into position between the cut-away portion $f$ and the depression $l$, and when released it will spring into the position shown in Fig. 2, firmly locking all the parts together and yet at the same time permitting a ready separation of the parts should such separation be necessary for any reason.

The advantages of my invention are obvious. It can be applied to any existing rail-joint, and the spring-plates $h$ and $j$ are so arranged as to bring a slight tension on the nuts $e$, which tends to hold them in position. Besides this, the nuts are firmly locked by the spring-clips $m$, so that they will not be loosened by any jarring caused by trains passing over the rails.

Having thus described my invention, what I claim as new, and desire to secure by Letters Patent of the United States, is—

1. In a railway-joint, the combination of railroad-rails, fish-plates, spring-plates applied to said fish-plates, one spring-plate outside of each fish-plate, bolts passing through said fish-plates and spring-plates, and nuts engaging the ends of said bolts, substantially as described.

2. In a railway-joint, the combination of rails, fish-plates, spring-plates applied to said fish-plates, one spring-plate outside of each fish-plate, bolts passing through said spring-plates and fish-plates, nuts engaging the ends of said bolts, and a locking device for each of said nuts, substantially as described.

3. In a railway-joint, the combination of rails, fish-plates, spring-plates outside of said fish-plates, bolts passing through said spring-plates and fish-plates, nuts engaging the ends of said bolts, said nuts being provided with cut-away portions, and one of said spring-plates being provided with depressions, and spring-clips adapted to fit in said depressions and cut-away portions, substantially as described.

4. In a railway-joint, the combination of rails, fish-plates applied thereto, spring-plates resting against said fish-plates, one of said spring-plates being provided with squared holes and the other being provided with round holes and depressions cut therein, bolts passing through said spring-plates, fish-plates, and rails, each of said bolts being provided with a squared portion near its head, and a screw-threaded portion at its other end, nuts engaging said bolts, each of said nuts having portions thereof cut away, and spring-clips adapted to fit in the cut-away portions of said nuts and the depressions in one of said spring-plates, substantially as described.

In testimony whereof I affix my signature in presence of two witnesses.

MILTON W. BELL.

Witnesses:
C. J. BELL,
WILBUR J. DINKEL.